(No Model.)

R. M. SNYDER.
HANDLE BAR FOR BICYCLES.

No. 567,663. Patented Sept. 15, 1896.

WITNESSES:
John Buckler,
C. Gerst

INVENTOR
Ransom M. Snyder
BY
Edgar Tate
ATTORNEYS

UNITED STATES PATENT OFFICE.

RANSOM M. SNYDER, OF NEW YORK, N. Y.

HANDLE-BAR FOR BICYCLES.

SPECIFICATION forming part of Letters Patent No. 567,663, dated September 15, 1896.

Application filed May 17, 1895. Serial No. 549,621. (No model.)

*To all whom it may concern:*

Be it known that I, RANSOM M. SNYDER, a citizen of the United States, and a resident of New York, county of New York, and State of New York, have invented certain new and useful Improvements in Handle-Bars for Bicycles, of which the following is a specification, reference being had to the accompanying drawings, forming a part thereof, in which similar letters of reference indicate corresponding parts.

My invention relates to handle-bars for bicycles; and the object thereof is to produce an improved device of this character which is reversible on the forward upright bar of the bicycle, and the side arms of which are so curved as to permit in one position thereof of a low grip or position of the handles and in the other of a much higher position thereof, or one which will enable the operator of the machine to sit in an upright position.

A further object of my invention is to provide additional handles which occupy a position midway between the highest and lowest position of the main handles, which are connected, or adapted to be connected, with the main handle-bar and in any line therewith and much nearer to the upright bar of the forward fork of the bicycle than is usual in this class of devices.

My invention is fully disclosed in the following specification, of which the accompanying drawings form a part, in which—

Figure 1:
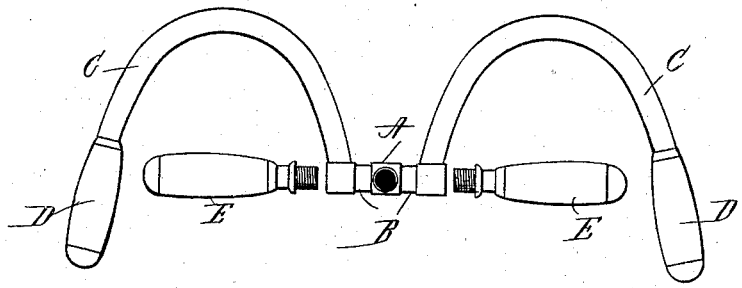
Figure 2:
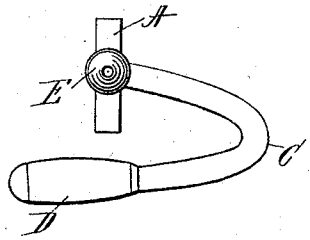

Figure 1 is a top plan view of my improved handle-bar, the secondary or auxiliary handles being shown as detached from the main handle-bar; Fig. 2, a side view thereof; and Fig. 3, a front view with the secondary or auxiliary handles secured in position, and the entire device being shown with the main arms and handles in the lowest position, the highest position being shown in dotted lines.

In the practice of my invention I provide a tubular head A, which is adapted to be connected with the upright bar of the forward fork of the bicycle in the usual manner, and the main handle-bar consists of tubular extensions B, connected therewith and extending therefrom at each side, as clearly shown in the drawings.

Figure 3:
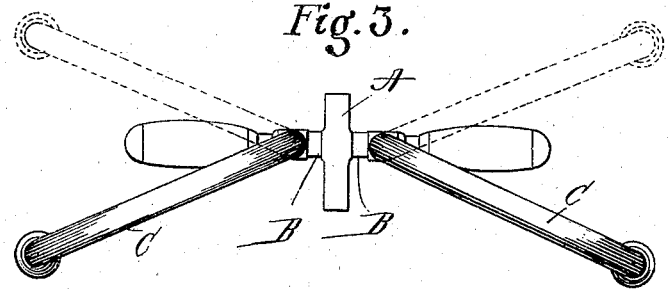

Connected with the sides of the outer ends of the tubular extensions B, or formed integrally therewith, are side arms C, which in my improvement are curved forwardly, downwardly, and backwardly, as shown in Fig. 3, and are provided at their ends with the usual handles or grips D.

It will be seen from this construction that when in the position shown in Fig. 3 the handles D, connected with the arms C, will occupy a comparatively low position, said position, as my improved handle-bar is constructed, being preferably from four to five inches below the line of the extensions B, which in my improvement constitutes the main handle-bar, and therefore when the position of the handle-bar is reversed the handles D will occupy a position from eight to ten inches above that shown in Fig. 3, as before described, the distance between these two positions depending entirely upon the curve of the arms C, as will be readily understood.

The supplemental or auxiliary handles E are designed to be connected with the ends of the extensions B and in line therewith, as shown, and it will be readily understood that these handles E will always occupy the same position and that this position will be one midway between the highest and lowest positions which the handles D may assume by the reversal of the handle-bar or the head B.

It will also be observed that the handles E are much nearer the upright bar of the bicycle-frame than the handles D, and that they are also arranged substantially at right angles thereto, thus providing means for changing the position of the hand and wrist when desired, and also enabling the operator of the machine to secure a hold or grasp the handle-bar much nearer to the upright bar than is possible with the usual form of handle-bars now in general use.

The handles E are connected with the extensions B, which constitute the main handle-bar, by means of screw-threaded extensions, as shown in Fig. 1 and as will be readily understood, though they may be secured in position in any desired manner, and as will be also understood the tubular head A may be connected with the upright bar of a bicycle-frame in the same manner in which such connections are now made, or by any means which may be deemed preferable, the essential feature being that said head be reversibly connected with its support, and this arrangement is, as hereinbefore described, only for the purpose of changing the position of the handles D on the arms C and does not change the position of the handles E.

It will thus be seen that I accomplish the object of my invention by means of a device which is exceedingly simple in construction, application, and operation, and which does not materially add to the cost of the bicycle or the machine to which it is applied.

Having fully described my invention, I claim and desire to secure by Letters Patent—

1. The combination of a tubular head adapted to be connected with the upright bar of the forward fork of a bicycle, a cross-head secured on said tubular head, side arms curved forwardly, downwardly and backwardly, and connected with the sides of the outer end of the cross-head, and provided with handles, and other handles connected with the ends of the cross-head, substantially as shown and described.

2. The combination with a tubular head adapted to be connected with the upright bar of the forward fork of a bicycle, and provided with a cross-head, secured to said tubular head, of side arms curved forward, downward and backward and connected with the sides of the outer end of the cross-head and provided with handles and other handles adapted to be connected with the end of the cross-head by a screw-thread, substantially as shown and described.

3. A bicycle handle-bar comprising a central portion adapted for connection with the steering-head and provided with supplemental handles at its ends, and downward-extended or drop arms connected at their inner ends to the sides of the central portion and provided with depressed handles at their outer ends.

In testimony that I claim the foregoing as my invention I have signed my name, in presence of two witnesses, this 15th day of May, 1895.

RANSOM M. SNYDER.

Witnesses:
  C. GERST,
  L. MULLER.